(12) United States Patent
Thimmannagari

(10) Patent No.: US 6,810,473 B2
(45) Date of Patent: Oct. 26, 2004

(54) REPLACEMENT ALGORITHM FOR A REPLICATED FULLY ASSOCIATIVE TRANSLATION LOOK-ASIDE BUFFER

(75) Inventor: Chandra M. R. Thimmannagari, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 52 days.

(21) Appl. No.: 10/336,708

(22) Filed: Jan. 6, 2003

(65) Prior Publication Data
US 2004/0133760 A1 Jul. 8, 2004

(51) Int. Cl.[7] .......................... G06F 12/10; G06F 12/12
(52) U.S. Cl. ........................................ 711/207; 711/159
(58) Field of Search .......................... 711/205–207, 159

(56) References Cited
U.S. PATENT DOCUMENTS
5,497,480 A * 3/1996 Hayes et al. ............... 711/166
2002/0065993 A1 * 5/2002 Chauvel .................... 711/144

* cited by examiner

Primary Examiner—Matthew D. Anderson
(74) Attorney, Agent, or Firm—Osha & May L.L.P.

(57) ABSTRACT

A method and apparatus determines whether there is an invalid address translation entry in a first translation look-aside buffer. If there is an invalid address translation entry in the first translation look-aside buffer, an invalid address translation entry in the first translation look-aside buffer is replaced. If there is no invalid address translation entry in the first translation look-aside buffer, a method and apparatus determines whether there is an invalid address translation entry in a second translation look-aside buffer. If there is an invalid address translation entry in the second translation look-aside buffer, an invalid address translation entry in the second translation look-aside buffer is replaced.

13 Claims, 5 Drawing Sheets

REPLACEMENT ALGORITHM FOR A REPLICATED FULLY ASSOCIATIVE TRANSLATION LOOK-ASIDE BUFFER

BACKGROUND OF INVENTION

As shown in FIG. 1, a typical computer (24) includes a processor (26), memory (28), a storage device (30), and numerous other elements and functionalities found in computers. The computer (24) may also include input means, such as a keyboard (32) and a mouse (34), and output means, such as a monitor (36). Those skilled in the art will appreciate that these input and output means may take other forms.

The processor (26) may contain internal memory (not shown), also called cache memory, in addition to the memory (28) that is external to the processor (26). The cache memory may provide a faster access time to load or store information compared to the memory (28). However, the cache memory typically holds less information than the memory (28).

FIG. 2 shows a block diagram of a typical memory system (200). In FIG. 2, a typical cache memory (210) and a typical main memory (220) are shown. The cache memory (210) may be internal to a processor (not shown), whereas the main memory (220) may be external to the processor. The cache memory (210) may have fewer address locations than the main memory (220). Consequently, the cache memory (210) may contain less information than the main memory (220).

A typical programming technique is to maintain virtual address locations. Virtual address locations improve the file size and speed of execution of a program. Furthermore, a programmer may be relieved of the task of managing a large address space. The virtual address locations may reference locations in the cache (210). In turn, the cache may maintain information that is a copy of a physical address in main memory (220). When a memory access occurs, the virtual address may be converted to a physical address. Page tables (not shown) record the translation of a virtual address to a physical address.

Page tables are typically large, and thus they are stored in the main memory (220). A small portion of the page tables may also be stored in the cache (210). Accordingly, a virtual memory access may take twice as long as a direct physical memory access because a first memory access to the main memory (220) and/or the cache (210) is needed to obtain the physical address translated from the virtual address and a second memory access to the main memory (220) and/or the cache (210) is needed to obtain the information.

One remedy is to remember recent address translations. The principle of temporal and spatial locality states that programs tend to reuse data and instructions (i.e., information) that a program has recently used. The principle of temporal locality states that recently accessed information is likely to be accessed in the near future. The principle of spatial locality states that information whose memory addresses are near one another tends to be referenced close together in time.

Accordingly, virtual memory accesses have locality. By keeping address translations in a special buffer, a memory access rarely requires an access to the main memory (220) and/or the cache (210) to translate a virtual address. A translation look-aside buffer, or TLB, is used to maintain a list of recent virtual address translations.

A fully associative translation look-aside buffer may allow a new entry to be added at any location. A fully associative translation look-aside buffer may, however, replace a least accessed entry. The least accessed entry may occur at any location in the in the fully associative translation look-aside buffer. A least accessed replacement algorithm follows the principle of locality.

In FIG. 2, a fully associative translation look-aside buffer (230) includes a comparison circuit (240), registers (245), and buffers (250). The buffers (250) maintain address translations from previous memory accesses. The registers (245) may maintain information about which entries in the buffers (250) are used or are available to add additional address translation entries. The comparison circuit (240) compares a virtual address used in a memory access to virtual addresses stored in the buffers (250). The comparison circuit (240) determines whether the virtual address has recently been translated. If the virtual address is in the buffers (250), a physical address, corresponding to the virtual address used in a memory access, is output from the fully associative translation look-aside buffer (230).

The fully associative translation look-aside buffer (230) may be required to add an additional address translation entry when all entries in the fully associative translation look-aside buffer (230) are occupied with previous address translation entries. The comparison circuit (240) may determine which address translation entry should be replaced based on a state of the registers (245).

Increasing a size of the fully associative translation look-aside buffer (230) increases a number of address translation entries that may be maintained thereby also increasing memory system performance. However, increasing the number of address translation entries in the fully associative translation look-aside buffer (230) may entail a large hardware design effort.

SUMMARY OF INVENTION

According to one aspect of the present invention, a method for address translation entry replacement comprising determining whether there is an invalid address translation entry in a first translation look-aside buffer; if there is an invalid address translation entry in the first translation look-aside buffer, replacing the invalid address translation entry in the first translation look-aside buffer; if there is no invalid address translation entry in the first translation look-aside buffer, determining if there is an invalid address translation entry in a second translation look-aside buffer; and if there is an invalid address translation entry in the second translation look-aside buffer, replacing the invalid address translation entry in the second translation look-aside buffer.

According to one aspect of the present invention, an apparatus comprising a first translation look-aside buffer where the first translation look-aside buffer comprises a first plurality of invalid registers associated with each of a first plurality of address translation entries; a second translation look-aside buffer where the second translation look-aside buffer comprises a second plurality of invalid registers associated with each of a second plurality of address translation entries; a first comparison circuit where the first comparison circuit is arranged to determine whether there is an invalid bit in the first plurality of invalid registers; and a second comparison circuit where the second comparison circuit is arranged to determine whether there is an invalid bit in the second plurality of invalid registers.

According to one aspect of the present invention, an apparatus comprising means for determining whether there is an invalid address translation entry in a first translation look-aside buffer; means for replacing an invalid address translation entry in the first translation look-aside buffer if there is an invalid address translation entry in the first translation look-aside buffer; means for determining whether there is an invalid address translation entry in a second translation look-aside buffer if there is no invalid address translation entry in the first translation look-aside buffer; and means for replacing an invalid address translation entry in the second translation look-aside buffer if there is an invalid address translation entry in the second translation look-aside buffer and there is no invalid address translation entry in the first translation look-aside buffer.

Other aspects and advantages of the invention will be apparent from the following description and the appended claims.

DETAILED DESCRIPTION

Embodiments of the present invention relate to an apparatus and method for using a plurality of fully associative translation look-aside buffers. An address translation entry replacement algorithm moves through the plurality of fully associative translation look-aside buffers to determine which address translation entry should be replaced. The replacement is determined using registers associated with each address translation entry. Using a plurality of fully associative translation look-aside buffers and the address translation entry replacement algorithm enables a large number of address translation entries, and a simplified hardware design from a timing perspective and an ability to make future enhancements to the hardware design.

Figure 1:
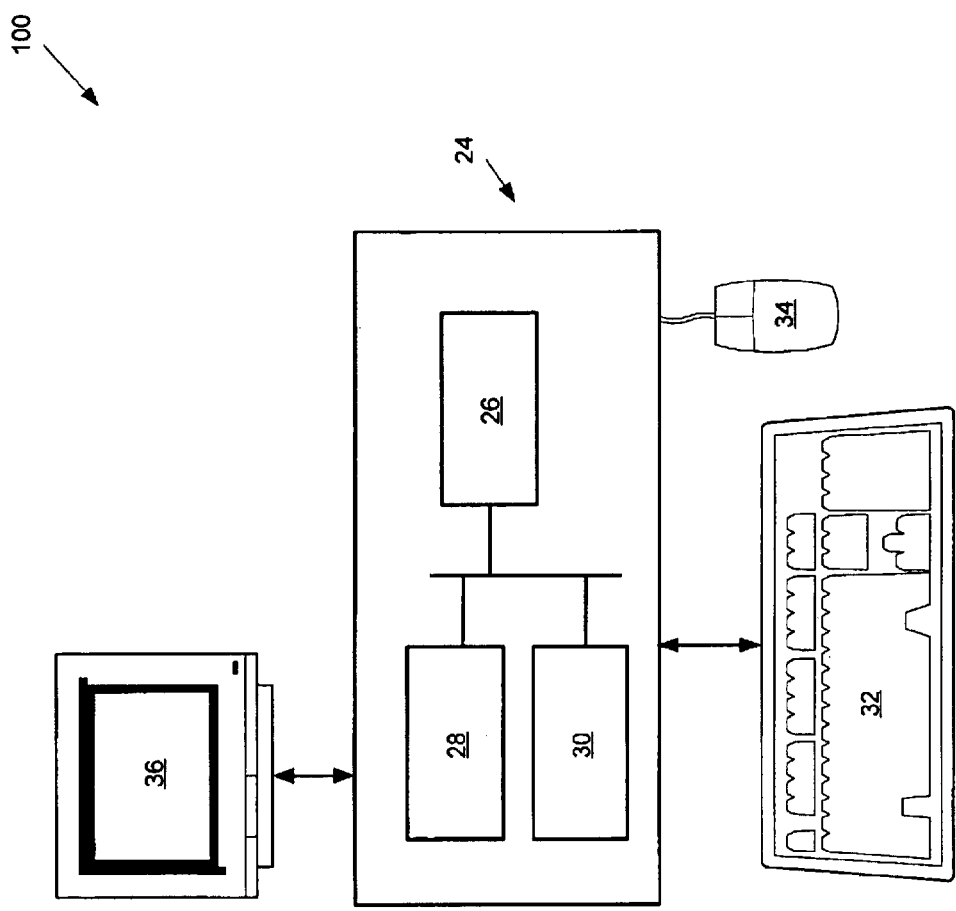
FIG. 1 shows a block diagram of a typical computer system.
Figure 2:
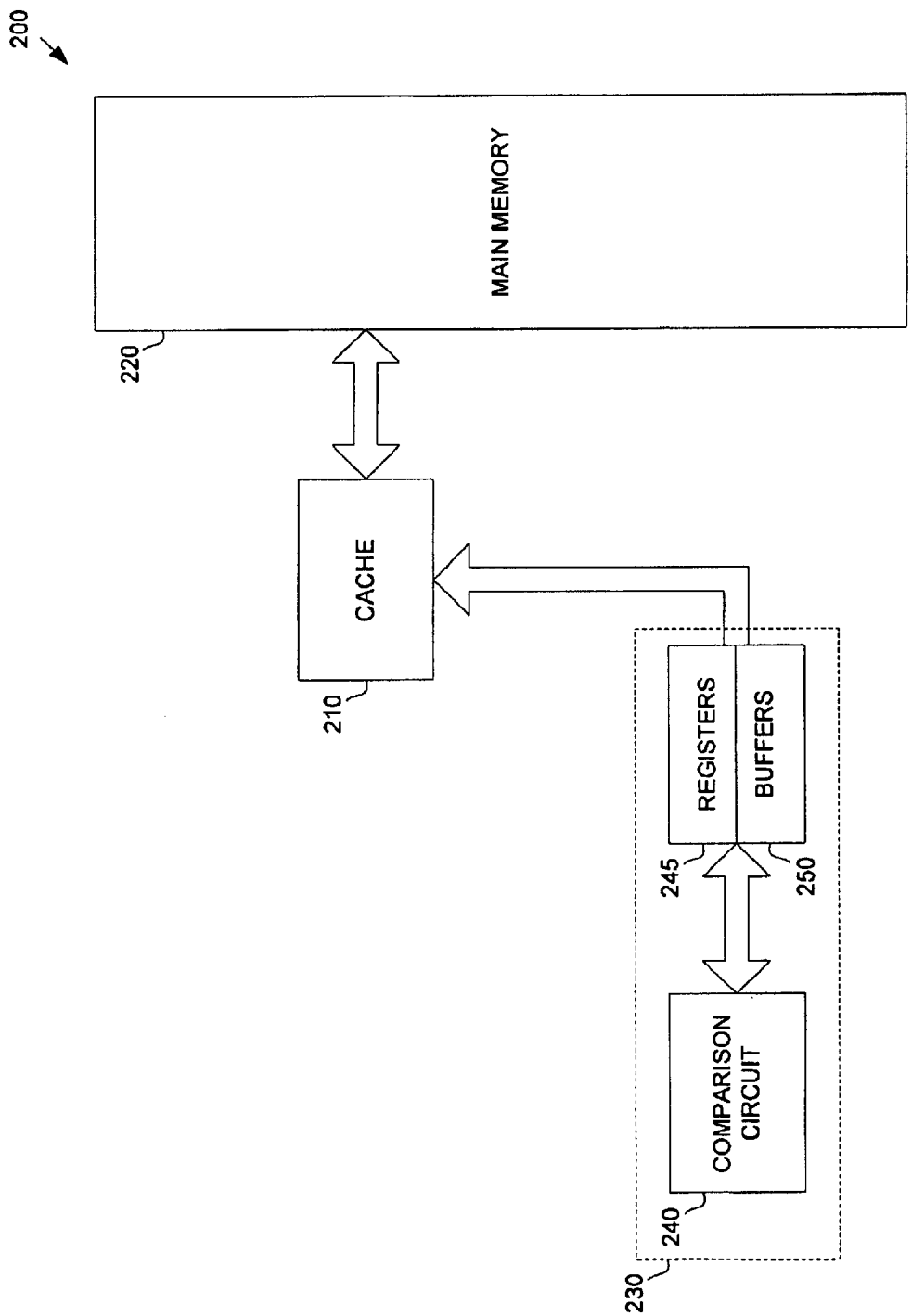
FIG. 2 shows a block diagram of a typical memory system.
Figure 3:
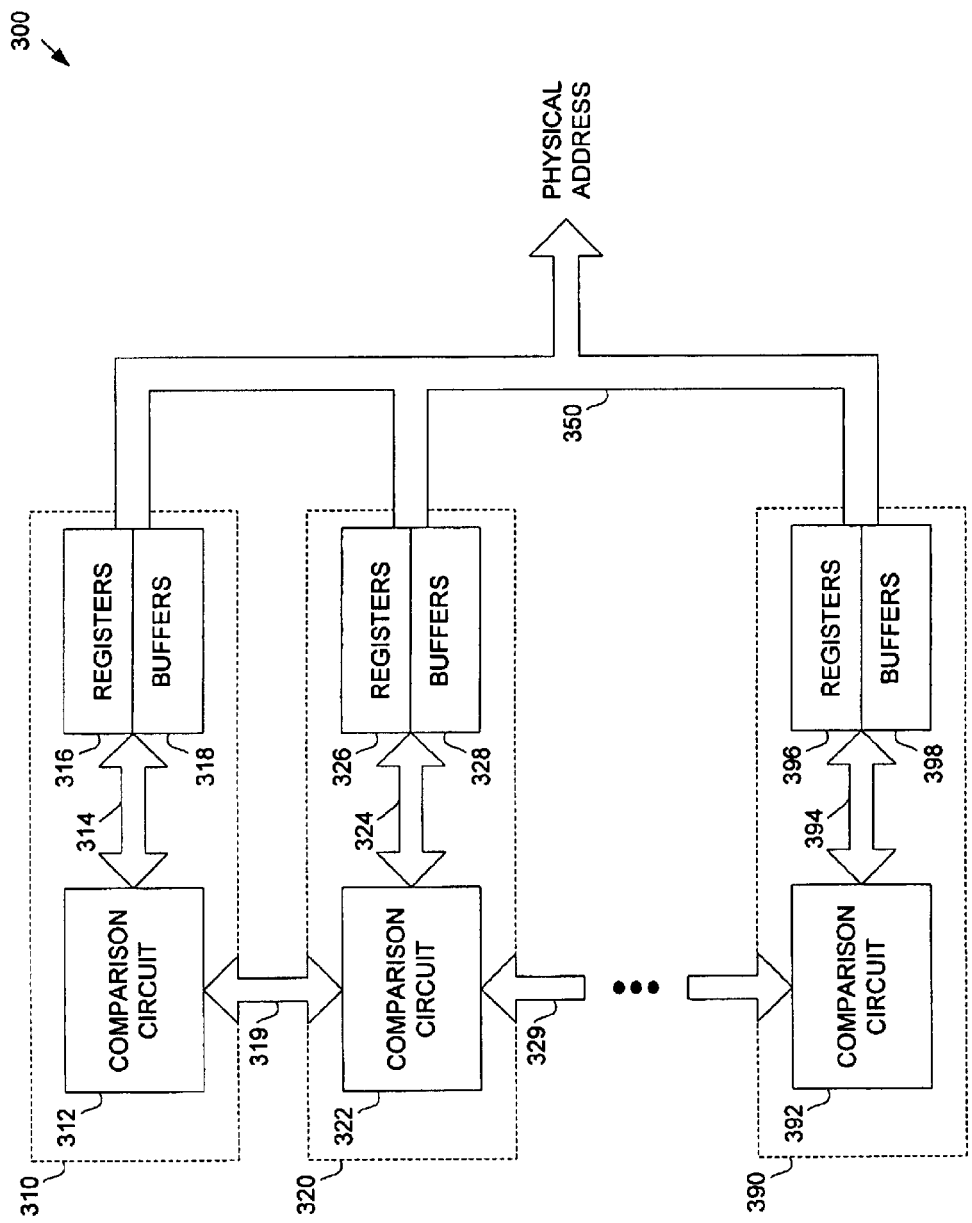
FIG. 3 shows a block diagram of a fully associative translation look-aside buffer apparatus in accordance with an embodiment of the present invention.

FIG. 3 shows a block diagram of an exemplary fully associative translation look-aside buffer apparatus (300) in accordance with an embodiment of the present invention. The fully associative translation look-aside buffer apparatus (300) includes a plurality of fully associative translation look-aside buffers (310, 320, 390). Each fully associative translation look-aside buffer (310, 320, 390) may be similar to each other. Each fully associative translation look-aside buffer (310, 320, 390) may have an equal number of address translation entries.

In FIG. 3, the exemplary fully associative translation look-aside buffer (310, 320, 390) includes a comparison circuit (312, 322, 392), registers (316, 326, 396), and buffers (318, 328, 398). The buffers (318, 328, 398) maintain address translations entries from previous memory accesses. The registers (316, 326, 396) may maintain information about which address translation entries in the buffers (318, 328, 398) are occupied or are available to add additional address translation entries.

The comparison circuit (312, 322, 392) compares a virtual address from a memory access to an address translation entry in the buffers (318, 328, 398) to determine if the virtual address has already been translated and is located in the buffers (318, 328, 398), respectively. A match between the virtual address and an address translation entry results in a physical address output on communication line(s) (350). The comparison circuit (312, 322, 392) along with the registers (316, 326, 396) may help determine which address translation entry is available for replacement with an additional address translation entry. Communication line(s) (314, 324, 394) allow the comparison circuit (312, 322, 392) to communicate with the registers (316, 326, 396) and the buffers (318, 328, 398), respectively.

The fully associative translation look-aside buffer (310, 320, 390) may be required to add an additional address translation entry. An address translation entry replacement algorithm moves through the plurality of fully associative translation look-aside buffers (310, 320, 390) to determine which address translation entry should be replaced. The address translation entry replacement algorithm may access each fully associative translation look-aside buffer (310, 320, 390) using communication line(s) (319, 329). The address translation entry replacement algorithm may perform comparisons and other operations in each of fully associative translation look-aside buffers (310, 320, 390).

The address translation entry replacement algorithm starts with the fully associative translation look-aside buffer (310). The comparison circuit (312) determines whether there is an invalid address translation entry indicated by the registers (316), and if there is an invalid address translation entry, the comparison circuit (312) provides information about the first invalid address translation entry to the address translation entry replacement algorithm. If there is an invalid address translation entry in the fully associative translation look-aside buffer (310), the address translation entry replacement algorithm fills the first invalid address translation entry with the additional address translation entry. If there is no invalid address translation entry in the fully associative translation look-aside buffer (310), the address translation entry replacement algorithm moves to the fully associative translation look-aside buffer (320).

The address translation entry replacement algorithm continues a search for an available address translation entry in the fully associative translation look-aside buffer (320). The comparison circuit (322) determines whether there is an invalid address translation entry indicated by the registers (326), and if there is an invalid address translation entry, the comparison circuit (322) provides information about the first invalid address translation entry to the address translation entry replacement algorithm. If there is an invalid address translation entry in the fully associative translation look-aside buffer (320), the address translation entry replacement algorithm fills the first invalid address translation entry with the additional address translation entry. If there is no invalid address translation entry in the fully associative translation look-aside buffer (320), the address translation entry replacement algorithm moves to the next fully associative translation look-aside buffer, e.g., fully associative translation look-aside buffer (390). The address translation entry replacement algorithm continues until no additional fully associative translation look-aside buffers (310, 320, 390) are available to be checked or until an invalid address translation entry is located.

If no invalid address translation entry exists in any of the fully associative translation look-aside buffers (310, 320, 390), the address translation entry replacement algorithm determines whether there is an available address translation entry in the translation look aside buffer (310) as indicated by the registers (316) based on a specified criteria. If the comparison circuit (312) determines that an address translation entry exists that meets the specified criteria, the address translation entry replacement algorithm fills the identified address translation entry with the additional address translation entry. If there is no address translation entry that meets the specified criteria in the fully associative translation look-aside buffer (310), the address translation entry replacement algorithm moves to the fully associative translation look-aside buffer (320).

The address translation entry replacement algorithm continues a search for an available address translation entry in the fully associative translation look-aside buffer (320). The comparison circuit (322) determines whether there is an available address translation entry in the translation look aside buffer (320) as indicated by the registers (326) based on a specified criteria. If the comparison circuit (322) determines that an address translation entry exists that meets the specified criteria, the address translation entry replacement algorithm fills the identified address translation entry with the additional address translation entry. If there is no address translation entry that meets the specified criteria in the fully associative translation look-aside buffer (320), the address translation entry replacement algorithm moves to the next fully associative translation look-aside buffer, e.g., fully associative translation look-aside buffer (390). The address translation entry replacement algorithm continues until no additional fully associative translation look-aside buffers (310, 320, 390) are available to be checked.

If the address translation entry replacement algorithm determines that no fully associative translation look-aside buffer (310, 320, 390) has an available address translation entry, a predetermined address translation entry may be assigned. The predetermined address translation entry may not be used until all specified criteria have been checked in all fully associative translation look-aside buffer (310, 320, 390).

One of ordinary skill in the art will understand that the address translation entry replacement algorithm may be enabled with a series of instructions executed by hardware. One of ordinary skill in the art will also understand that the address translation entry replacement algorithm may be enabled with hardware designed to perform the steps of the address translation entry replacement algorithm. In one or more embodiments, the hardware designed to perform the steps of the address translation entry replacement algorithm may include a state machine.

Figure 4:
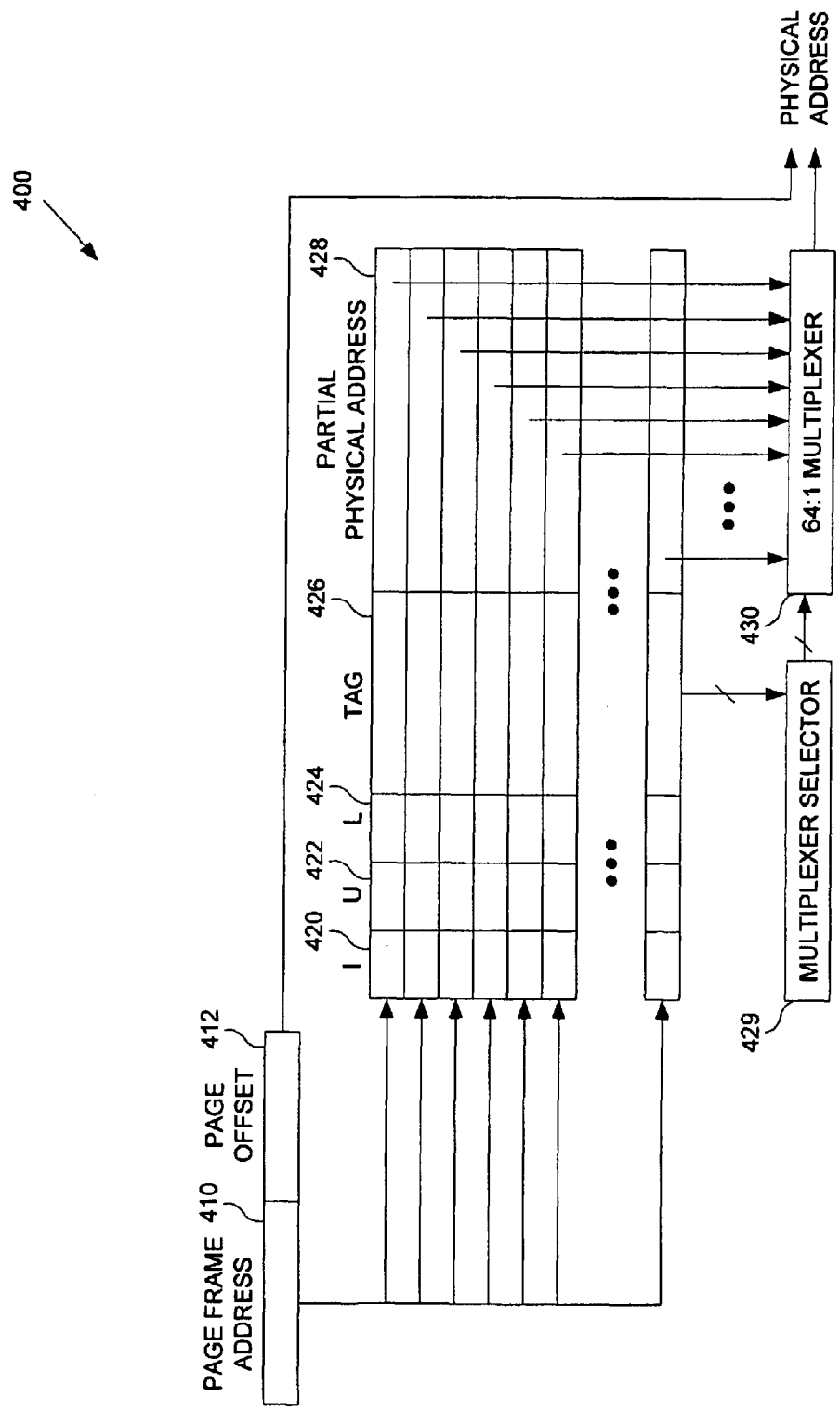
FIG. 4 shows a block diagram of a fully associative translation look-aside buffer in accordance with an embodiment of the present invention.

FIG. 4 shows a block diagram of an exemplary fully associative translation look-aside buffer (400) in accordance with an embodiment of the present invention. Each address translation entry in the fully associative translation look-aside buffer (400) includes registers, i.e., an invalid register (420), a used register (422), and a locked register (424). Each address translation entry in the fully associative translation look-aside buffer (400) also includes a buffer that may contain a tag (426), or virtual address, and a physical address or partial physical address (428) that is associated with the tag (426).

In FIG. 4, a memory access provides a page frame address (410) and a page offset (412). The page frame address (410) is used to compare against the tag (426). A match between the page frame address (410) and the tag (426) results in a multiplexer selector (429) selecting one of the partial physical addresses (428) associated with the matching tag (426). A selected one of the partial physical addresses (428) is output using a 64:1 multiplexer (430). The selected one of the partial physical addresses (428) combined with the page offset (412) provides a complete physical address. The complete physical address may be used to access a specific location in a cache memory or a main memory.

In FIG. 4, a memory access may not find a matching tag (426) in the fully associative translation look-aside buffer (400). Accordingly, an address translation entry may be read from cache memory or main memory and added to the fully associative translation look-aside buffer (400) with the expectation that the address translation may be needed for future memory accesses. A comparison circuit (not shown) determines which address translation entry in the buffer may be replaced.

The registers (420, 422, 424) are used by an address translation entry replacement algorithm to determine which address translation entry is replaced. Each register (420, 422, 424) maintains a bit. The bit may be in one of two states to indicate one of two conditions for each address translation entry, e.g., valid or invalid, used or unused, locked or unlocked.

During power up of the fully associative translation look-aside buffer (400), the invalid register (420) has all bits set as invalid. When an address translation entry is first added to a buffer, the invalid register (420) has a bit set as valid. During power up of the fully associative translation look-aside buffer (400), the used register (422) has all bits set as unused. When an address translation entry is added to a buffer, the used register (422) is set as used. An address translation entry replacement algorithm may change the used register (422) to set as used or unused depending on a state of the fully associative translation look-aside buffer (400). During power up of the fully associative translation look-aside buffer (400), the locked register (424) has all bits set as unlocked. An operating system may change a state of a locked register (424) bit to locked. For example, an address translation entry for access to a translation look-aside buffer trap handler code may be locked. If a locked address translation entry is replaced, a system fault may occur.

One of ordinary skill in the art will understand that different arrangements of registers and bits may be used. The purpose of the registers is to determine a state of an address translation entry with respect to the availability of an address translation entry to be replaced. One of ordinary skill in the art will also understand that a memory access may provide only the page frame address (410) for comparison with a tag (426). One of ordinary skill in the art will also understand that a tag (426) may be associated with a complete physical address.

Figure 5:
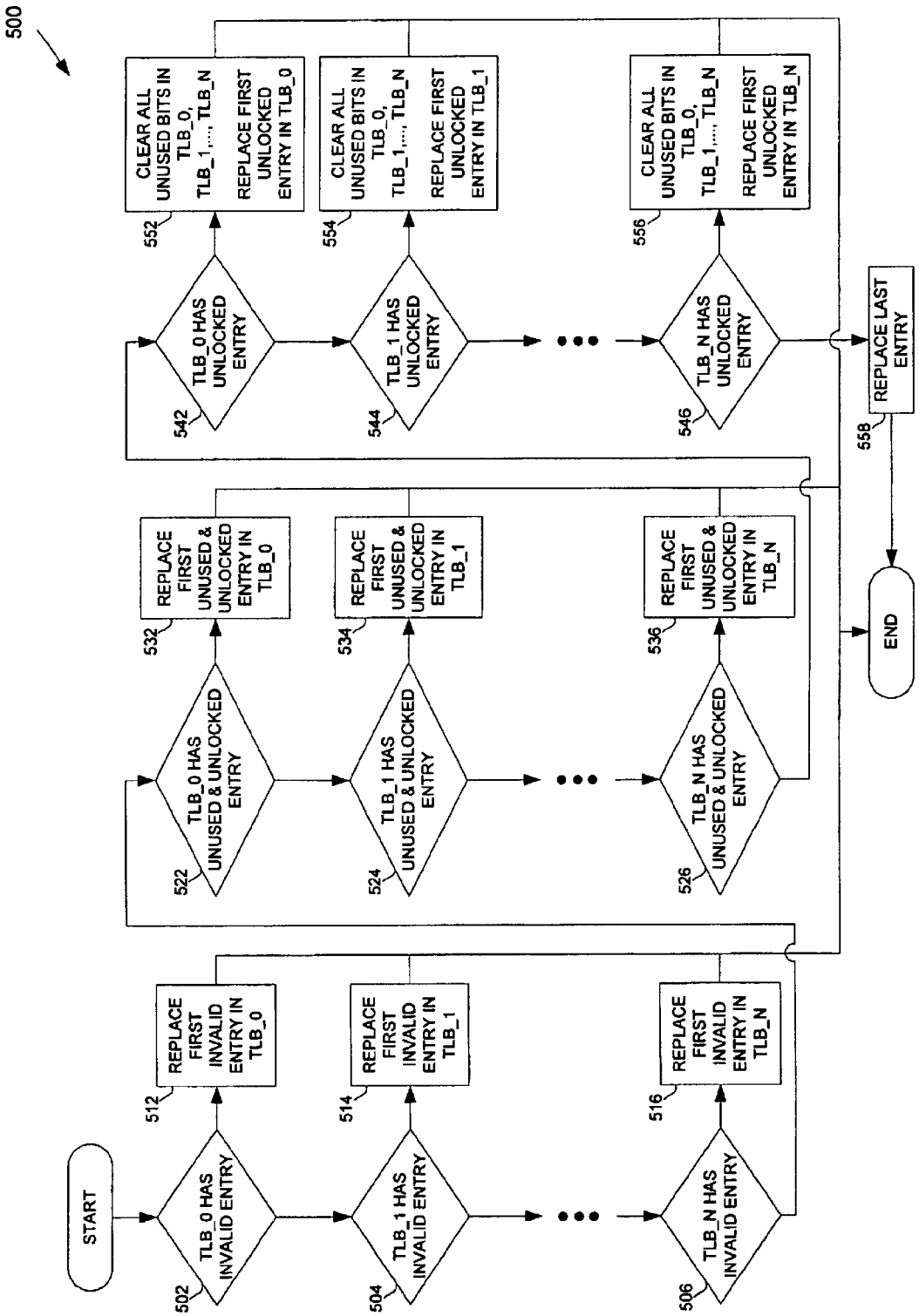
FIG. 5 shows a flow diagram of an address translation entry replacement algorithm in accordance with an embodiment of the present invention.

FIG. 5 shows a flow diagram of an exemplary address translation entry replacement algorithm (500) in accordance with an embodiment of the present invention. The address translation entry replacement algorithm (500) replaces an address translation entry with an additional address translation entry. The address translation entry replacement algorithm (500) uses, for example, N fully associative translation look-aside buffers, or TLBs, in the flow diagram. One of ordinary skill in the art will understand that the address translation entry replacement algorithm (500) may use two or more fully associative translation look-aside buffers.

The address translation entry replacement algorithm (500) determines whether there is an invalid address translation entry in TLB_0 (step 502). If there is an invalid address translation entry in TLB_0, the invalid address translation entry in TLB_0 is replaced with the additional address translation entry (step 512), and the address translation entry replacement algorithm (500) ends. If there is no invalid address translation entry in TLB_0, the address translation entry replacement algorithm (500) determines whether there is an invalid address translation entry in TLB_1 (step 504). If there is an invalid address translation entry in TLB_1, the invalid address translation entry in TLB_1 is replaced with the additional address translation entry (step 514), and the address translation entry replacement algorithm (500) ends. If there is no invalid address translation entry in TLB_1, the address translation entry replacement algorithm (500) determines whether there is an invalid address translation entry in TLB_N (step 506). If there is an invalid address translation entry in TLB_N, the invalid address translation entry in TLB_N is replaced with the additional address translation entry (step 516), and the address translation entry replacement algorithm (500) ends.

If there is no invalid address translation entry in TLB_N, the address translation entry replacement algorithm (500) determines whether there is an unused and unlocked address translation entry in TLB_0 (step 522). If there is an unused and unlocked address translation entry in TLB_0, the unused and unlocked address translation entry in TLB_0 is replaced with the additional address translation entry (step 532), and the address translation entry replacement algorithm (500) ends. If there is no unused and unlocked address translation entry in TLB_0, the address translation entry replacement algorithm (500) determines whether there is an unused and unlocked address translation entry in TLB_1 (step 524). If there is an unused and unlocked address translation entry in TLB_1, the unused and unlocked address translation entry in TLB_1 is replaced with the additional address translation entry (step 534), and the address translation entry replacement algorithm (500) ends. If there is no unused and unlocked address translation entry in TLB_1, the address translation entry replacement algorithm (500) determines whether there is an unused and unlocked address translation entry in TLB_N (step 526). If there is an unused and unlocked address translation entry in TLB_N, the unused and unlocked address translation entry in TLB_N is replaced with the additional address translation entry (step 536), and the address translation entry replacement algorithm (500) ends.

If there is no unused and unlocked address translation entry in TLB_N, the address translation entry replacement algorithm (500) determines whether there is an unlocked address translation entry in TLB_0 (step 542). If there is an unlocked address translation entry in TLB_0, all used registers in TLB_0, TLB_1, . . . , TLB_N are set to unused and the unlocked address translation entry in TLB_0 is replaced with the additional address translation entry (step 552). The address translation entry replacement algorithm (500) ends. If there is no unlocked address translation entry in TLB_0, the address translation entry replacement algorithm (500) determines whether there is an unlocked address translation entry in TLB_1 (step 544). If there is an unlocked address translation entry in TLB_1, all used registers in TLB_0, TLB_1, . . . , TLB_N are set to unused and the unlocked address translation entry in TLB_1 is replaced with the additional address translation entry (step 554). The address translation entry replacement algorithm (500) ends. If there is no unlocked address translation entry in TLB_1, the address translation entry replacement algorithm (500) determines whether there is an unlocked address translation entry in TLB_N (step 546). If there is an unlocked address translation entry in TLB_N, all used registers in TLB_0, TLB_1, . . . , TLB_N are set to unused and the unlocked address translation entry in TLB_N is replaced with the additional address translation entry (step 556). The address translation entry replacement algorithm (500) ends.

If there is no unlocked address translation entry in TLB_N, the address translation entry replacement algorithm (500) replaces a specified address translation entry with the additional address translation entry (step 558). For example, the last address translation entry in TLB_N may be used. The address translation entry replacement algorithm (500) ends.

One of ordinary skill in the art will understand that the address translation entry replacement algorithm may be adapted to use fully associative translation look-aside buffers with a different set of registers.

One of ordinary skill in the art will understand that the address translation entry replacement algorithm (500) may be used with a plurality of fully associative translation look-aside buffers, e.g., the fully associative translation look-aside buffers (310, 320, 390) shown in FIG. 3. Furthermore, both the address translation entry replacement algorithm (500) and the fully associative translation look-aside buffers (310, 320, 390) may be modified to support N-way associative address translation.

Advantages of the embodiments of the present invention may include one or more of the following. A plurality of fully associative translation look-aside buffers is used. Because a single fully associative translation look-aside buffer may be designed and copied, a large hardware design effort may not be needed. An address translation entry replacement algorithm may use two or more fully associative translation look-aside buffers. Increasing a number of address translation entries in a fully associative translation look-aside buffer apparatus includes adding one or more copies of a fully associative translation look-aside buffer.

In one or more embodiments, an address translation entry replacement algorithm performs a pseudo least recently used replacement scheme. An address translation entry replacement algorithm may use fully associative translation look-aside buffers with an equal number or different number of address translation entries. An address translation entry replacement algorithm, while operating on a plurality of fully associative translation look-aside buffers, may perform comparisons and other operations in parallel to reduce the time needed to determine an available address translation entry for replacement with an additional address translation entry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for address translation entry replacement, comprising:
    determining whether there is an invalid address translation entry in a first translation look-aside buffer;
    if there is an invalid address translation entry in the first translation look-aside buffer, replacing the invalid address translation entry in the first translation look-aside buffer;
    if there is no invalid address translation entry in the first translation look-aside buffer, determining if there is an invalid address translation entry in a second translation look-aside buffer; and
    if there is an invalid address translation entry in the second translation look-aside buffer, replacing the invalid address translation entry in the second translation look-aside buffer.

2. The method of claim 1, wherein a number of address translation entries in the first translation look-aside buffer and in the second translation look-aside buffer are equal.

3. The method of claim 1, further comprising:

determining whether there is an unused and unlocked address translation entry in the first translation look-aside buffer;

if there is an unused and unlocked address translation entry in the first translation look-aside buffer, replacing the unused and unlocked address translation entry in the first translation look-aside buffer;

if there is no unused and unlocked address translation entry in the first translation look-aside buffer, determining if there is an unused and unlocked address translation entry in the second translation look-aside buffer; and if there is an unused and unlocked address translation entry in the second translation look-aside buffer, replacing the unused and unlocked address translation entry in the second translation look-aside buffer.

4. The method of claim 1, further comprising:

determining whether there is an unlocked address translation entry in the first translation look-aside buffer;

if there is an unlocked address translation entry in the first translation look-aside buffer, replacing the unlocked address translation entry in the first translation look-aside buffer;

if there is no unlocked address translation entry in the first translation look-aside buffer, determining if there is an unlocked address translation entry in the second translation look-aside buffer; and if there is an unlocked address translation entry in the second translation look-aside buffer, replacing the unlocked address translation entry in the second translation look-aside buffer.

5. The method of claim 1, further comprising:

if there is an unlocked address translation entry in the first translation look-aside buffer, clearing used bits in the first translation look-aside buffer and in the second translation look-aside buffer; and if there is an unlocked address translation entry in the second translation look-aside buffer, clearing used bits in the first translation look-aside buffer and in the second translation look-aside buffer.

6. The method of claim 1, further comprising:

if all address translation entries in the first translation look-aside buffer and in the second translation look-aside buffer are locked, used, and valid, replacing a predetermined address translation.

7. The method of claim 1, further comprising:

if there is no invalid address translation entry in the first translation look-aside buffer and in the second translation look-aside buffer, determining if there is an invalid address translation entry in a third translation look-aside buffer; and if there is an invalid address translation entry in the third translation look-aside buffer, replacing the invalid address translation entry in the third translation look-aside buffer.

8. The method of claim 7, wherein a number of address translation entries in the first translation look-aside buffer, in the second translation look-aside buffer, and in the third translation look-aside buffer are equal.

9. The method of claim 7, further comprising:

if there is no unused and unlocked address translation entry in the first translation look-aside buffer and in the second translation look-aside buffer, determining if there is an unused and unlocked address translation entry in the third translation look-aside buffer; and if there is an unused and unlocked address translation entry in the third translation look-aside buffer, replacing the unused and unlocked address translation entry in the third translation look-aside buffer.

10. The method of claim 7, further comprising:

if there is no unlocked address translation entry in the first translation look-aside buffer and in the second translation look-aside buffer, determining if there is an unlocked address translation entry in the third translation look-aside buffer; and if there is an unlocked address translation entry in the third translation look-aside buffer, replacing the unlocked address translation entry in the third translation look-aside buffer.

11. The method of claim 7, further comprising:

if there is an unlocked address translation entry in the third translation look-aside buffer, clearing used bits in the first translation look-aside buffer, in the second translation look-aside buffer, and in the third translation look-aside buffer.

12. The method of claim 7, further comprising:

if all address translation entries in the first translation look-aside buffer, in the second translation look-aside buffer, and in the third translation look-aside buffer are locked, used, and valid, replacing a predetermined address translation.

13. An apparatus, comprising:

means for determining whether there is an invalid address translation entry in a first translation look-aside buffer;

means for replacing an invalid address translation entry in the first translation look-aside buffer if there is an invalid address translation entry in the first translation look-aside buffer;

means for determining whether there is an invalid address translation entry in a second translation look-aside buffer if there is no invalid address translation entry in the first translation look-aside buffer; and means for replacing an invalid address translation entry in the second translation look-aside buffer if there is an invalid address translation entry in the second translation look-aside buffer and there is no invalid address translation entry in the first translation look-aside buffer.

* * * * *